(12) United States Patent
Temple et al.

(10) Patent No.: US 12,394,063 B2
(45) Date of Patent: Aug. 19, 2025

(54) SYSTEM AND METHOD FOR DETERMINING BACKGROUND

(71) Applicant: CRON AI LTD., London (GB)

(72) Inventors: Robert De Temple, Essen (DE); Bastiaan Willem Kwaadgras, London (GB)

(73) Assignee: Mohammad Saud M Alghaith, Riyadh (SA)

( * ) Notice: Subject to any disclaimer, the term of this patent is extended or adjusted under 35 U.S.C. 154(b) by 424 days.

(21) Appl. No.: 18/148,831

(22) Filed: Dec. 30, 2022

(65) Prior Publication Data

US 2024/0221172 A1 Jul. 4, 2024

(51) Int. Cl.
*G06T 7/194* (2017.01)
*G06V 10/764* (2022.01)
*G06V 10/766* (2022.01)

(52) U.S. Cl.
CPC ............ *G06T 7/194* (2017.01); *G06V 10/764* (2022.01); *G06V 10/766* (2022.01); *G06T 2207/10028* (2013.01)

(58) Field of Classification Search
CPC .......... G06T 7/194; G06T 2207/10028; G06V 10/764; G06V 10/766
See application file for complete search history.

(56) References Cited

U.S. PATENT DOCUMENTS 10,163,256 B2* 12/2018 Benedek ................. G06T 7/194
10,182,225 B1* 1/2019 Cui ......................... G06V 10/30
11,328,401 B2* 5/2022 Lu .............................. G06T 7/10
11,605,201 B2* 3/2023 Ichim ...................... G06T 7/593
12,125,298 B2* 10/2024 Sun ....................... G01S 7/4808

FOREIGN PATENT DOCUMENTS

| CN | 103675939 B | 5/2016 |
|----|-------------|--------|
| CN | 112150501 A | 12/2020 |
| CN | 112419360 A | 2/2021 |

(Continued)

OTHER PUBLICATIONS

Tianya Zhang, Peter J. Jin, Roadside LiDAR Vehicle Detection and Tracking Using Range and Intensity Background Subtraction.

(Continued)

*Primary Examiner* — Gregory M Desire
(74) *Attorney, Agent, or Firm* — Colson Law Group, PLLC

(57) ABSTRACT

A method for determining a background includes: receiving, via a sensor, a plurality of data points for a 3D space; dividing the 3D space into a plurality of rays extending from the sensor; defining a plurality of peaks for each ray; defining a catchment region for each peak for each ray and including a catchment distance from the corresponding peak towards and away from the sensor; and updating the catchment distance of the catchment region. Each data point is enclosed by a corresponding ray. Each peak is located at a peak distance from the sensor and includes a peak height. For each data point from the plurality of data points, the method includes: determining the corresponding ray enclosing the data point; determining a containing peak for which the data point lies within the catchment region; and incrementing the peak height of the containing peak by a peak increment value.

20 Claims, 14 Drawing Sheets

(56) References Cited

FOREIGN PATENT DOCUMENTS

| CN | 114596331 A | 6/2022 |
|----|-------------|--------|
| CN | 113447953 B | 8/2022 |
| JP | 7107015 B2 | 7/2022 |
| KR | 102214848 B1 | 2/2021 |
| WO | 2021097618 A1 | 5/2021 |

OTHER PUBLICATIONS

Sumyeong Lee, Chansoo Kim, Sungjin Cho, Sunwoo Myoungho, Kichun Jo, Robust 3-Dimension Point Cloud Mapping in Dynamic Environment Using Point-Wise Static Probability-Based NDT Scan-Matching, Oct. 6, 2020, IEEE Access, Seoul, South Korea.
J. P. Underwood, D Gillsjo, T. Bailey, V. Vlaskine, Explicit 3D Change Detection using Ray-Tracing in Spherical Coordinates.
Gheorghii Postica, Matteo Matteucci, Andrea Romanoni, Visually aided changes detection in 3D lidar based reconstruction, Politecnico Di Milano, Milan, Italy.

\* cited by examiner

| Data Point (114) | Data Point Distance (116) | Invalid Match (158) | Fringe Match (156) | Center Match (154) | Peak (140) | Center Count (154A) | Fringe Count (156A) |
|---|---|---|---|---|---|---|---|
| DP1 | D1 | - | - | 1 | Peak 1 | 1 | 1 |
| DP2 | D2 | - | 1 | - | | | |
| DP3 | - | - | - | 1 | Peak 2 | 1 | 1 |
| DP4 | D3 | - | - | - | | | |
| DP5 | D4 | - | 1 | - | | | |
| DP6 | - | - | - | - | | | |
| DP7 | - | - | - | - | Peak 3 | - | - |
| DP8 | - | - | - | - | | | |
| DP9 | - | - | - | - | | | |
| DP10 | D5 | 1 | - | - | | | |

*FIG. 6*

SYSTEM AND METHOD FOR DETERMINING BACKGROUND

TECHNICAL FIELD

The present disclosure relates to a system for determining a background in a three-dimensional (3D) space and a method thereof.

BACKGROUND

Typically, a three-dimensional (3D) object detection system preprocesses point cloud data of a 3D space. Such preprocessing may improve an accuracy of predictions as well as reduce computational load of the 3D object detection system. This may be especially important if the 3D object detection system is on an embedded system, where computational resources may come at a premium.

For high-resolution point cloud data, a very common and challenging preprocessing step is background detection. Background detection is used to identify background portions of the point cloud data that represent stationary objects or more precisely surfaces on them, such as buildings or ground, which are unlikely to ever move. Such background portions need to be differentiated from other portions of the point cloud data that represent objects that are in motion or have moved recently.

The background portions of the point cloud data can subsequently be removed from the point cloud data in order to lessen the computational load of subsequent processing steps and/or improve a 3D perception (e.g., object detection) of the 3D object detection system.

Conventional background detection techniques may not be accurate, may be slow, may be inefficient, and/or require extreme computational resources (e.g., intensive in memory use). Therefore, such conventional techniques may not be feasible for the embedded systems.

SUMMARY

In a first aspect, the present disclosure provides a method for determining a background in a three-dimensional (3D) space. The method includes receiving, via a sensor, a point cloud data set for the 3D space. The point cloud data set includes a plurality of data points. The method further includes dividing the 3D space into a plurality of rays extending from the sensor. Each ray includes an azimuth and an elevation with respect to the sensor. Each data point is enclosed by a corresponding ray from the plurality of rays. The method further includes defining a plurality of peaks for each ray from the plurality of rays. Each peak from the plurality of peaks is located at a peak distance from the sensor and includes a peak height equal to a predetermined initial value. The method further includes defining a catchment region for each peak from the plurality of peaks for each ray from the plurality of rays. The catchment region for each peak includes a catchment distance from the corresponding peak towards the sensor and the catchment distance from the corresponding peak away from the sensor. For each data point from the plurality of data points, the method further includes: determining the corresponding ray from the plurality of rays enclosing the data point; determining a data point distance of the data point from the sensor; determining a peak increment value; determining a containing peak from the plurality of peaks of the corresponding ray for which the data point lies within the catchment region of the containing peak; incrementing the peak height of the containing peak by the peak increment value; and defining a new peak including a peak height equal to the peak increment value and a peak distance equal to the data point distance if the data point is outside the catchment region of each of the plurality of peaks of the corresponding ray. The method further includes updating the catchment distance of the catchment region of each of the plurality of peaks of each of the plurality of rays.

In a second aspect, the present disclosure provides a system for determining a background in a 3D space. The system includes a sensor configured to generate a point cloud data set for the 3D space. The point cloud data set includes a plurality of data points. The system further includes a processor communicably coupled to the sensor. The processor is configured to receive the point cloud data set from the sensor. The processor is further configured to divide the 3D space into a plurality of rays extending from the sensor. Each ray includes an azimuth and an elevation with respect to the sensor. Each data point is enclosed by a corresponding ray from the plurality of rays. The processor is further configured to define a plurality of peaks for each ray from the plurality of rays. Each peak from the plurality of peaks is located at a peak distance from the sensor and includes a peak height equal to a predetermined initial value. The processor is further configured to define a catchment region for each peak from the plurality of peaks for each ray from the plurality of rays. The catchment region for each peak includes a catchment distance from the corresponding peak towards the sensor and the catchment distance from the corresponding peak away from the sensor. For each data point from the plurality of data points, the processor is further configured to: determine the corresponding ray from the plurality of rays enclosing the data point; determine a data point distance of the data point from the sensor; determine a peak increment value; determine a containing peak from the plurality of peaks of the corresponding ray for which the data point lies within the catchment region of the containing peak; increment the peak height of the containing peak by the peak increment value; and define a new peak including a peak height equal to the peak increment value and a peak distance equal to the data point distance if the data point is outside the catchment region of each of the plurality of peaks of the corresponding ray. The processor is further configured to update the catchment distance of the catchment region of each of the plurality of peaks of each of the plurality of rays.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

FIG. 6 illustrates a schematic view of a statistical data pool, according to an embodiment of the present disclosure;

DETAILED DESCRIPTION

Figure 1:
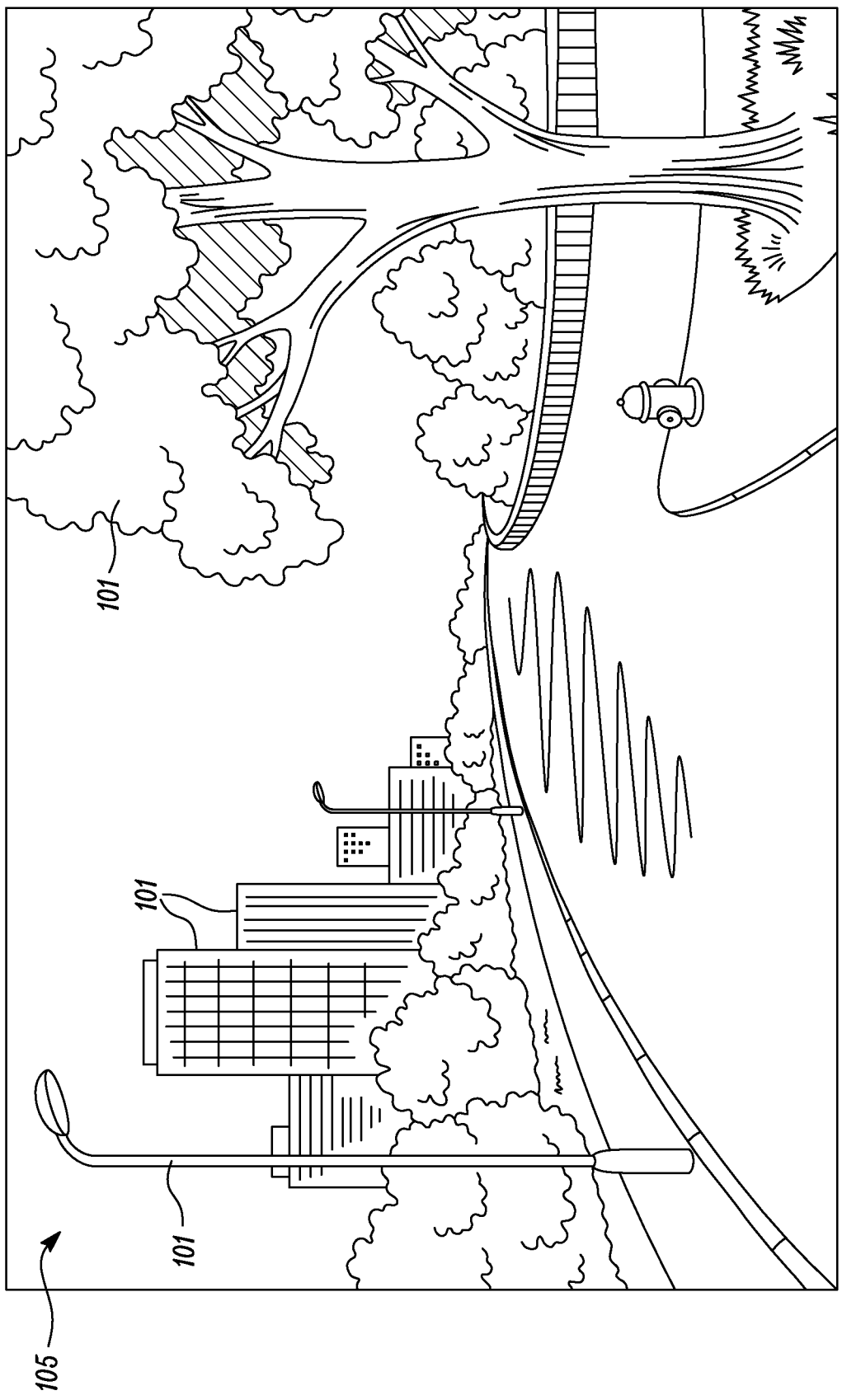
FIG. 1 illustrates a schematic view of an exemplary background in a three-dimensional (3D) space.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

As used herein, the terms "communicably coupled to" and "communicably connected to" refers to direct coupling between components and/or indirect coupling between components via one or more intervening components. Such components and intervening components may comprise, but are not limited to, junctions, communication paths, components, circuit elements, circuits, functional blocks, and/or devices. As an example of indirect coupling, a signal conveyed from a first component to a second component may be modified by one or more intervening components by modifying the form, nature, or format of information in a signal, while one or more elements of the information in the signal are nevertheless conveyed in a manner that can be recognized by the second component.

As used herein, the term "communication device" generally includes a transceiver, and/or other devices for communicating with other devices directly or via a network, and/or a user interface for communicating with one or more users.

As used herein, the term "azimuth" refers to an angle between a point projected onto a reference plane and a reference direction on the reference plane.

As used herein, the term "elevation" refers to an angle above or below the reference plane.

Typically, a three-dimensional (3D) object detection system preprocesses point cloud data of a 3D space. Such preprocessing may improve an accuracy of predictions as well as reduce computational load of the 3D object detection system. This may be especially important if the 3D object detection system is on an embedded system, where computational resources may come at a premium.

For high-resolution point cloud data, a very common and challenging preprocessing step is background detection. Background detection is used to identify background portions of the point cloud data that represent stationary objects or more precisely surfaces on them, such as buildings or ground, which are unlikely to ever move. Such background portions need to be differentiated from other portions of the point cloud data that represent objects that are in motion or have moved recently. The background portions of the point cloud data can subsequently be removed from the point cloud data in order to lessen the computational load of subsequent processing steps and/or improve a 3D perception (e.g., object detection) of the 3D object detection system.

Conventional background detection techniques may not be accurate, may be slow, may be inefficient, and/or require extreme computational and memory resources. Therefore, such conventional techniques may not be feasible for the embedded systems. Therefore, it may be advantageous to detect background with high accuracy, in real-time, and with reduced computational and memory resource requirements.

The present disclosure provides a system and a method for determining a background in a three-dimensional (3D) space.

The method includes receiving, via a sensor, a point cloud data set for the 3D space. The point cloud data set includes a plurality of data points. The method further includes dividing the 3D space into a plurality of rays extending from the sensor. Each ray includes an azimuth and an elevation with respect to the sensor. Each data point is enclosed by a corresponding ray from the plurality of rays. The method further includes defining a plurality of peaks for each ray from the plurality of rays. Each peak from the plurality of peaks is located at a peak distance from the sensor and includes a peak height equal to a predetermined initial value. The method further includes defining a catchment region for each peak from the plurality of peaks for each ray from the plurality of rays. The catchment region for each peak includes a catchment distance from the corresponding peak towards the sensor and the catchment distance from the corresponding peak away from the sensor. For each data point from the plurality of data points, the method further includes: determining the corresponding ray from the plurality of rays enclosing the data point; determining a data point distance of the data point from the sensor; determining a peak increment value; determining a containing peak from the plurality of peaks of the corresponding ray for which the data point lies within the catchment region of the containing peak; incrementing the peak height of the containing peak by the peak increment value; and defining a new peak including a peak height equal to the peak increment value and a peak distance equal to the data point distance if the data point is outside the catchment region of each of the plurality of peaks of the corresponding ray. The method further includes updating the catchment distance of the catchment region of each of the plurality of peaks of each of the plurality of rays.

The method of the present disclosure may use minimal computational and memory resources, such that the method may be suitable for running or implementing on the system, such as an embedded computer system, where computational resources may come at a premium. The most frequent operations of the method may be short and include additions and subtractions, as well as multiplications or divisions by powers of 2 of integer numbers. This may further minimize utilization of the computational and memory resources. The method may also be able to accurately track the static objects or background visible to the sensor in arbitrarily complex environments even in the presence of multiple distances reported by the sensor with each measurement. The system may further be simple to set-up and configure. Specifically, no particular setup or measurement may be required for implementing the method in a new or a different location.

The method may further provide estimates of precision/noise level (e.g., due to environmental effects) of the sensor and may continuously optimize the operation according to the current noise level. The method may also be adaptive to changes in the background (e.g., when an object is placed in view of the sensor and is stationary afterwards). Further, the method may be able to distinguish between the static and dynamic/non-static objects with a very high resolution. Furthermore, by tracking the noise level of the sensor, the high resolution should be at or close to an optimal separation limit (as allowed by the noise level of the sensor).

Further by updating the catchment distance, the method may help to optimize the catchment distance and adapt the system to changing environmental noise (e.g., from rain, fog, or lighting conditions), slow drifts or differences in performance of the sensor, or similar. In some cases, the updated values of the catchment distances may also be provided to a sensor health or performance monitoring system as high sensor noise levels may be indicative of sensor degradation or failures.

Therefore, the system and the method of the present disclosure may be computationally efficient, highly accurate and adaptive to changing environments, and provide real-time estimates.

Referring now to figures, FIG. 1 illustrates a schematic view of an exemplary three-dimensional (3D) space 105. The 3D space 105 includes various objects. In some cases, the objects may include static objects, i.e., the objects that are stationary and are unlikely to ever move. For example, the static objects may include buildings, roads, posts, grounds, etc., in the 3D space 105. In some cases, the objects may include dynamic objects (not shown), i.e., the objects that are moving or are likely to move. The 3D space 105 includes a background 101. The background 101 includes the static objects or specifically, surfaces of the static objects. In some cases, the objects may include also include semi-static objects, i.e., the objects that may sway. For example, the semi-static objects may include plants, trees, etc., in the 3D space 105. In some cases, the background 101 may also include the semi-static objects. In the illustrated example of FIG. 1, the 3D space is an outdoor space (i.e., a street). However, in some other examples, the 3D space 105 may be an indoor space (e.g., a part of a floor area in a building).

Figure 2:
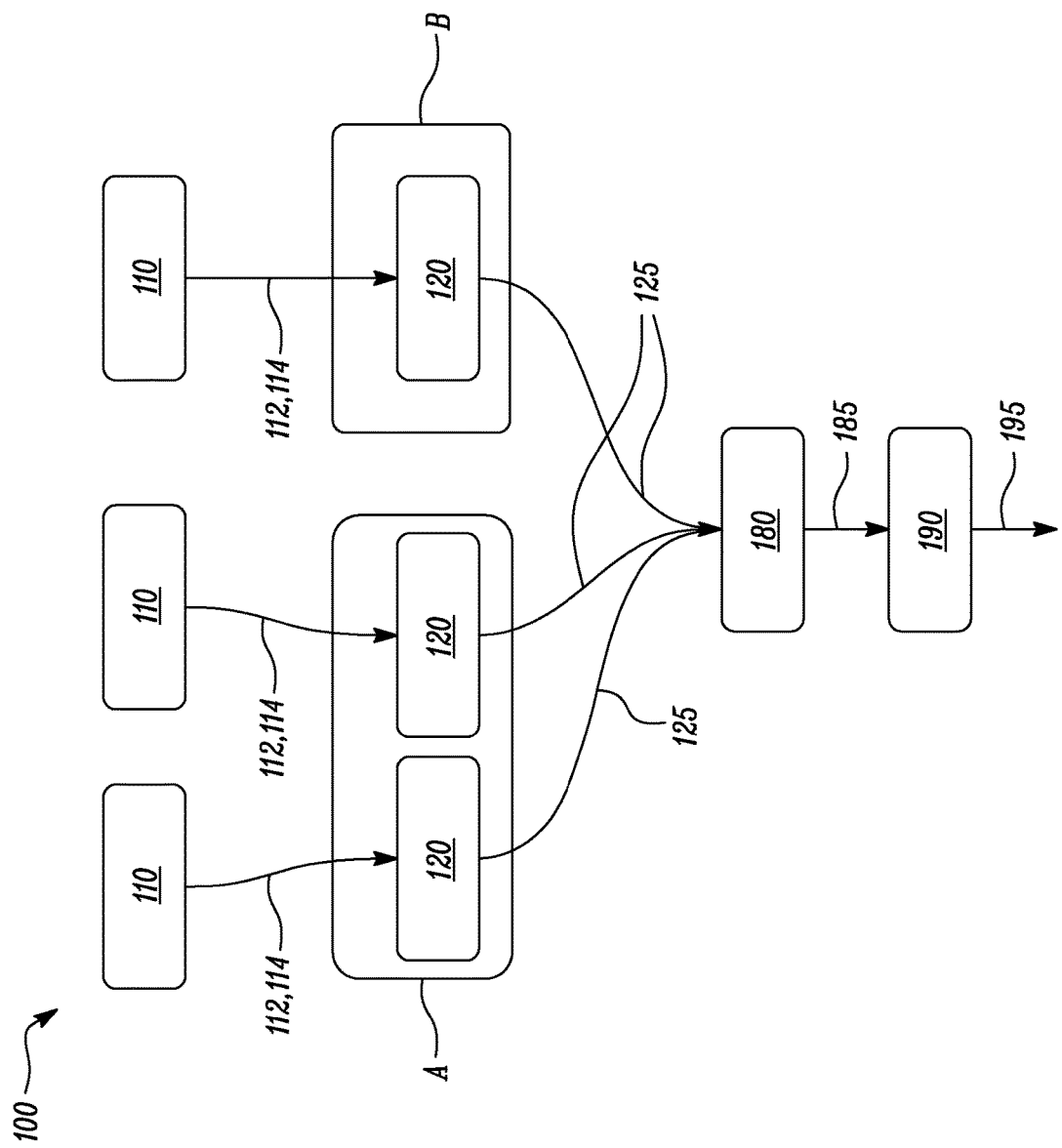
FIG. 2 illustrates a schematic block diagram of a system for determining the background in the 3D space, according to an embodiment of the present disclosure.

FIG. 2 illustrates a schematic block diagram of a system 100 for determining the background 101 (shown in FIG. 1) in the 3D space 105 (shown in FIG. 1), according to an embodiment of the present disclosure.

The system 100 includes a sensor 110 configured to generate a point cloud data set 112 for the 3D space 105. The point cloud data set 112 includes a plurality of data points 114. In some embodiments, the sensor 110 includes a 3D sensor. In an example, the 3D sensor is a light detection and ranging (LIDAR) sensor (e.g., frequency-modulated continuous-wave LIDAR), a radio detection and ranging (RADAR) sensor, an ultrasonic sensor array, a 3D camera (e.g., a time-of-flight camera, a depth camera, a stereo camera, etc.), or a combination thereof.

The system 100 further includes a processor 120. In some embodiments, the processor 120 may be implemented in a computing device A. The processor 120 is communicably coupled to the sensor 110. Specifically, in some embodiments, the computing device A is communicably coupled to the sensor 110. The processor 120 is configured to receive the point cloud data set 112 from the sensor 110. In other words, the processor 120 is configured to receive the plurality of data points 114.

In some embodiments, the computing device A may include a system-on-chip (SOC), a computer processing unit (CPU), a graphical processing unit (GPU), a tensor processing unit (TPU), a neuromorphic chip, a vector accelerator, or any other processing system. Examples of the computing device A may include a personal computer (PC), a laptop, a tablet, a touch pad, a portable computer, a handheld computer, a palmtop computer, a personal digital assistant (PDA), a smart device (e.g., smart phone, smart tablet, or smart mobile television), a mobile internet device (MID), a data communication device, a server, a desktop computer, an edge computing device, and so forth. In some examples, the computing device A also may include devices that are configured to be worn by a person. In some embodiments, the computing device A may be capable of executing other applications, as well as voice communications and/or data communications.

In the illustrated embodiment of FIG. 2, the system 100 includes a plurality of sensors 110 and a corresponding plurality of processors 120. However, the system 100 may include any number of sensors and processors, as per desired application attributes. The plurality of sensors 110 is configured to generate a corresponding plurality of point cloud data sets 112 for the 3D space 105 shown in FIG. 1. Further, the corresponding plurality of processors 120 is configured to receive the corresponding plurality of point cloud data sets 112 from the plurality of sensors 110.

In some other embodiments, one or more of the plurality of sensors 110 may be communicably coupled to one processor 120 from the plurality of processors 120. Each of the plurality of processors 120 is capable of executing an algorithm that causes the processor 120 to perform one or more of the actions, operations, methods, or functions described herein. In some embodiments, one instance of the algorithm is used for each sensor 110.

In some embodiments, at least one of the plurality of processors 120 may be implemented in a computing device B. In some embodiments, the computing device B may be substantially similar to the computing device A. However, in some other embodiments, the computing device B may be different from the computing device A.

In some embodiments, the system 100 may further include a point cloud fusion module 180. The point cloud fusion module 180 may fuse outputs 125 from each of the plurality of processors 120 to obtain a fused cloud data set 185.

In some embodiments, the system 100 may further include an object detection module 190. In some embodiments, the object detection module 190 is configured to provide one or more perception outputs 195 based on the fused cloud data set 185. In some embodiments, the one or more perception outputs 195 may include object detection, semantic segmentation, such as object boundaries and pose estimation, or any other information about the objects in the 3D space 105. Therefore, the system 100 may be used for people-tracking applications in a static setting to object detection applications in an autonomous vehicle.

Figure 3:
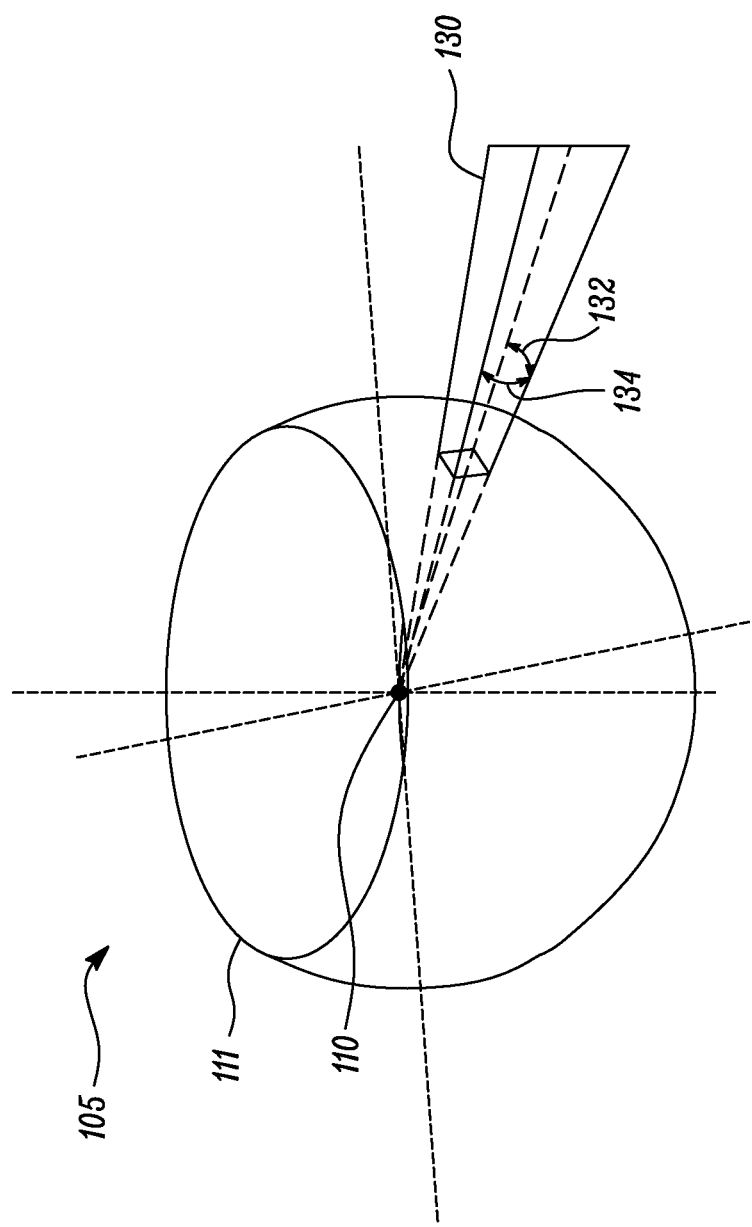
FIG. 3 illustrates a schematic view of a sensor and a field of view (FOV) of the sensor in the 3D space, according to an embodiment of the present disclosure.

FIG. 3 illustrates a schematic view of the sensor 110 and a field of view (FOV) 111 of the sensor in the 3D space 105, according to an embodiment of the present disclosure. The FOV 111 may be representative of an angular range the sensor 110 (e.g., the LIDAR sensor) covers in one measurement or frame.

Referring to FIGS. 1, 2, and 3, the processor 120 is further configured to divide the 3D space 105 into a plurality of rays 130 extending from the sensor 110. In the illustrated embodiment of FIG. 3, only one ray 130 is shown for clarity purposes.

Each ray 130 includes an azimuth 132 and an elevation 134 with respect to the sensor 110. In other words, the processor 120 is configured to divide the 3D space 105 by the azimuth 132 and the elevation 134 as measured with respect to the sensor 110 to obtain the plurality of rays 130 extending from the sensor 110. In some embodiments, the azimuth 132 and the elevation 134 may be less than about 0.2 degrees, less than about 0.1 degrees, or less than about 0.05 degrees. Therefore, each of the plurality of rays 130 may be very narrow.

Further, each data point 114 is enclosed by a corresponding ray 130C (shown in FIG. 4A) from the plurality of rays 130.

In the illustrated embodiment of FIG. 3, a portion of the 3D space 105 encompassed by each of the plurality of rays 130 is an approximately square pyramid with its tip at the sensor 110. However, as discussed above, each of the plurality of rays 130 may be very narrow, and therefore will be treated as a one-dimensional representation. A ray typically refers to a line that has a fixed starting point but no endpoint. Similarly, the rays 130 extend from the sensor 110.

Figure 4A:
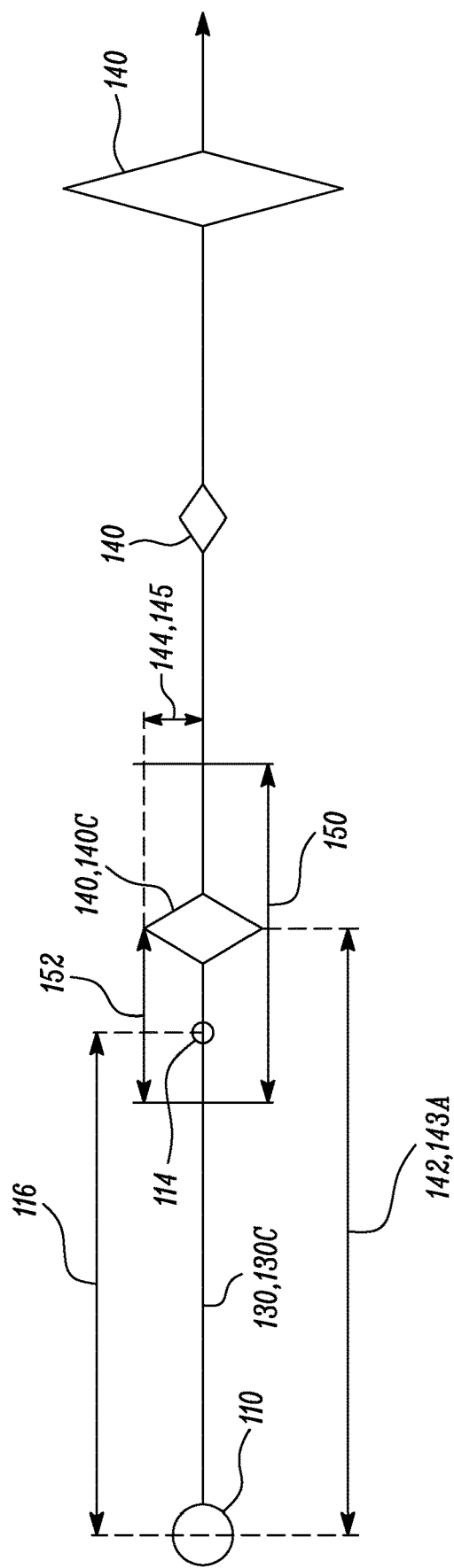
FIG. 4A illustrates a schematic representation of a corresponding ray from a plurality of rays enclosing a data point, according to an embodiment of the present disclosure.

FIG. 4A illustrates a schematic representation of the corresponding ray 130C from the plurality of rays 130 enclosing the data point 114 from the plurality of data points 114, according to an embodiment of the present disclosure. As shown in FIG. 4A, the plurality of rays 130 extends from the sensor 110.

Now referring to FIGS. 1 to 4A, the processor 120 is further configured to define a plurality of peaks 140 for each ray 130 from the plurality of rays 130. In the illustrated embodiment of FIG. 4A, the processor 120 is configured to define three peaks 140 for each ray 130 from the plurality of rays 130. However, the processor 120 may be configured to define any number of the peaks 140 for each ray 130, as per desired application attributes. In an example, storing one peak 140 in 4 bytes of storage space may be sufficiently accurate for almost all applications of the sensor 110. Assuming the three peaks 140 for each ray 130 and 2048×64 rays 130 within the FOV 111 of the sensor 110, a very modest memory usage of less than 1536 kilobytes (kB) may be required. Therefore, the algorithm may be suitable for the system 100 even if the system 100 is the embedded system.

Each peak 140 from the plurality of peaks 140 is located at a peak distance 142 from the sensor 110 and includes a peak height 144 equal to a predetermined initial value 145. Upon initialization of the algorithm, the plurality of peaks 140 may be located at any arbitrary peak distance 142 from the sensor 110 and may include any arbitrary peak height 144. For example, upon initialization, the predetermined initial value 145 of the peak height 144 may be equal to zero. In the illustrated embodiment of FIG. 4A, the peak distance 142 and the peak height 144 are shown for just one peak for clarity purposes. However, it should be noted that each peak 140 from the plurality of peaks 140 includes the peak distance 142 and the peak height 144.

The processor 120 is further configured to define a catchment region 150 for each peak 140 from the plurality of peaks 140 for each ray 130 from the plurality of rays 130. The catchment region 150 for each peak 140 includes a catchment distance 152 from the corresponding peak 140 towards the sensor 110 and the catchment distance 152 from the corresponding peak 140 away from the sensor 110. Therefore, the catchment region 150 is twice the catchment distance 152. In the illustrated embodiment of FIG. 4A, the catchment region 150 and the catchment distance 152 are shown for just one peak 140 for clarity purposes. However, it should be noted that each peak 140 from the plurality of peaks 140 includes the catchment region 150 and the catchment distance 152.

In some embodiments, the catchment distance 152 for a peak 140 from the plurality of peaks 140 for each ray 130 from the plurality of rays 130 is defined based upon the peak distance 142 of the peak 140, i.e., the catchment distance 152=f(p), where p is the peak distance 142.

In some embodiments, upon initialization of the algorithm, the catchment distance 152 may have any generic initial value. In some cases, the initial value may be based on a type of the sensor 110. In some examples, the initial value of the catchment distance 152 may be equal to about 0.10 meters (m), 0.15 m, or 0.20 m.

Further, for each data point 114 from the plurality of data points 114, the processor 120 is further configured to determine the corresponding ray 130C from the plurality of rays 130 enclosing the data point 114. Further, for each data point 114 from the plurality of data points 114, the processor 120 is further configured to determine a data point distance 116 of the data point 114 from the sensor 110.

For each data point 114 from the plurality of data points 114, the processor 120 is further configured to determine a containing peak 140C from the plurality of peaks 140 of the corresponding ray 130C for which the data point 114 lies within the catchment region 150 of the containing peak 140C.

In some embodiments, the processor 120 is configured to store the data point distance 116 of the data point 114 in a statistical data pool 165 (shown in FIG. 6) when the data point 114 lies within the catchment region 150 of the containing peak 140C. In some embodiments, the processor 120 may be configured to subsample the data points 114 lying within the catchment region 150 of the containing peak 140C for storing respective data point distances 116 of the data points 114 in the statistical data pool 165. For example, the processor 120 may be configured to store only a fraction of data point distances 116 corresponding to the fraction of the data points 114 lying within the catchment region 150 of the containing peak 140C in the statistical data pool 165. This may further reduce the computational load of the system 100. Specifically, this may reduce the computational load of the processor 120.

In some embodiments, in case the data point 114 lies within the catchment region 150 of multiple peaks 140 from the plurality of peaks 140 of the corresponding ray 130C, the processor 120 is further configured to determine the containing peak 140C based on at least one of the peak heights 144 of the multiple peaks 140, the peak distances 142 of the multiple peaks 140, and a distance of the data point 114 from each of the multiple peaks 140. In some other examples, the processor 120 may select the containing peak 140C from the multiple peaks 140 randomly.

Figure 4B:
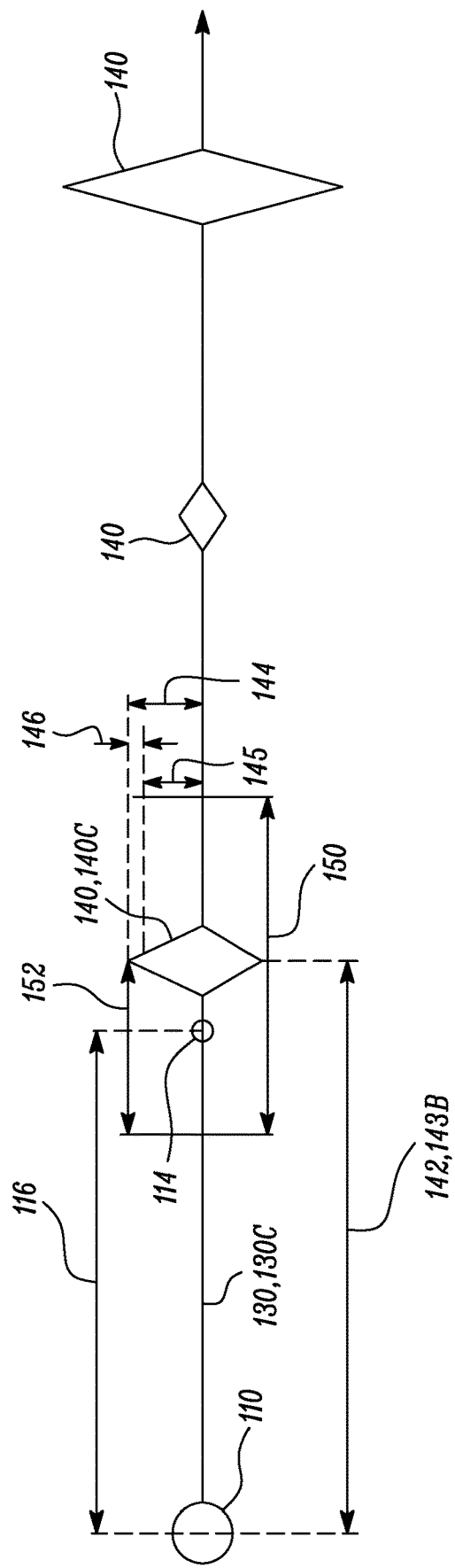
FIG. 4B illustrates a schematic representation of the corresponding ray having a plurality of peaks including a containing peak for which the data point lies within a catchment region of the containing peak, according to an embodiment of the present disclosure.

FIG. 4B illustrates a schematic representation of the corresponding ray 130C having the containing peak 140C for which the data point 114 lies within the catchment region 150 of the containing peak 140C, according to an embodiment of the present disclosure.

Now referring to FIGS. 1 to 4B, for each data point 114 from the plurality of data points 114, the processor 120 is further configured to determine a peak increment value 146. In some embodiments, the processor 120 may determine a greater peak increment value 146 for the data point 114 farther from the sensor 110 as compared to a data point 114 closer to sensor 110. In other words, the peak increment value 146 for the farther data points 114 may be greater than that of the closer data points 114. This is because the static objects of the background 101 are typically the farthest in the FOV 111 of the sensor 110 and the dynamic and the semi-static objects tend to move and are visible in front of the static objects of the background 101.

For each data point 114 from the plurality of data points 114, the processor 120 is further configured to increment the peak height 144 of the containing peak 140C by the peak increment value 146.

In some embodiments, the processor 120 is further configured to update the peak distance 142 of the containing peak 140C based at least on the data point distance 116 of the data point 114 lying within the catchment region 150 of the containing peak 140C. In some embodiments, the peak distance 142 of the containing peak 140C is updated based on a difference between the peak distance 142 of the containing peak 140C and the data point distance 116 of the data point 114 lying within the catchment region 150 of the containing peak 140C. For example, the peak distance 142 of the containing peak 140C is updated from an initial peak distance 143A (shown in FIG. 4A) to an updated peak distance 143B. As is apparent from FIG. 4B, the containing peak 140C follows or moves towards the data point 114 when the peak distance 142 of the containing peak 140C is updated.

In some embodiments, for each data point 114 from the plurality of data points 114, the processor 120 is further configured to determine a backgroundness of the data point 114. The backgroundness of the data point 114 refers to a likelihood that the data point 114 is a result of the measurement of the static object/surface in the 3D space 105. In some embodiments, the processor 120 is further configured to determine the backgroundness of the data point 114 based at least on the peak height 144, the peak distance 142, and the catchment distance 152 of the catchment region 150 for the containing peak 140C, if the data point 114 lies within the catchment region 150 of the containing peak 140C. In some embodiments, the backgroundness is determined further based on a magnitude of a difference between the data point distance 116 and the peak distance 142 of the containing peak 140C. In other words, the backgroundness may be determined further based on a closeness of the data point 114 to the containing peak 140C. The system 100 may provide accurate and real-time estimates for the backgroundness of the data point 114. In other words, the system 100 may provide accurate and real-time estimates for the likelihood of the data point 114 belonging to either the static object/surfaces or to dynamic objects, including when the dynamic objects may be moving discontinuously (e.g., the dynamic object may stop for periods of time).

Figure 4C:
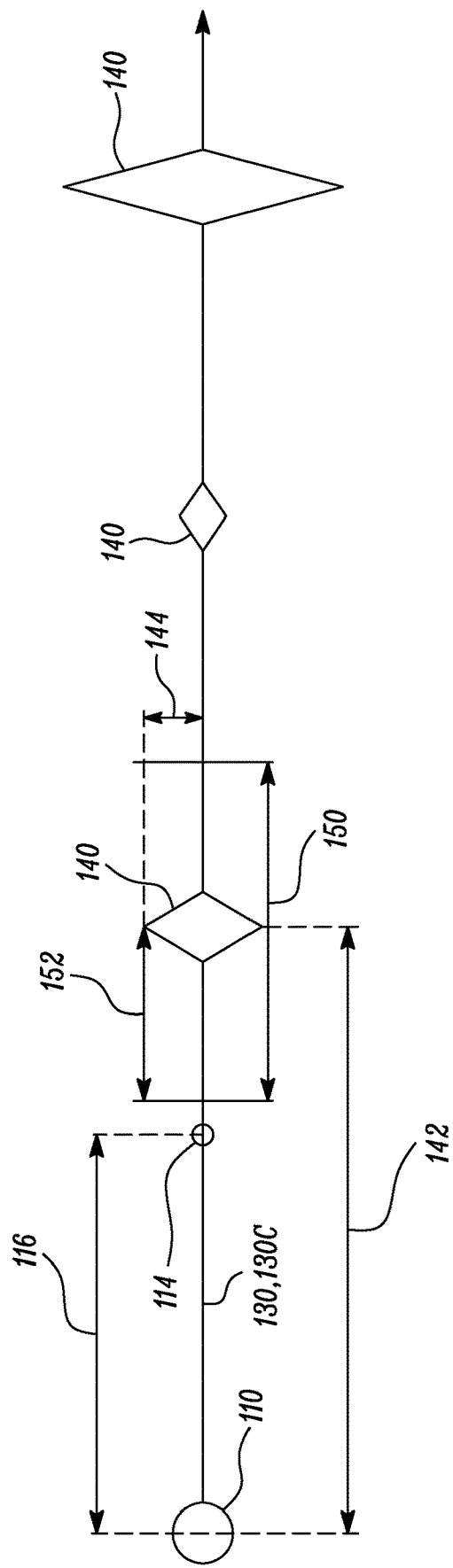
FIG. 4C illustrates a schematic representation of the corresponding ray of the data point, while the data point is outside the catchment region of each of the plurality of peaks of the corresponding ray, according to an embodiment of the present disclosure.
Figure 4D:
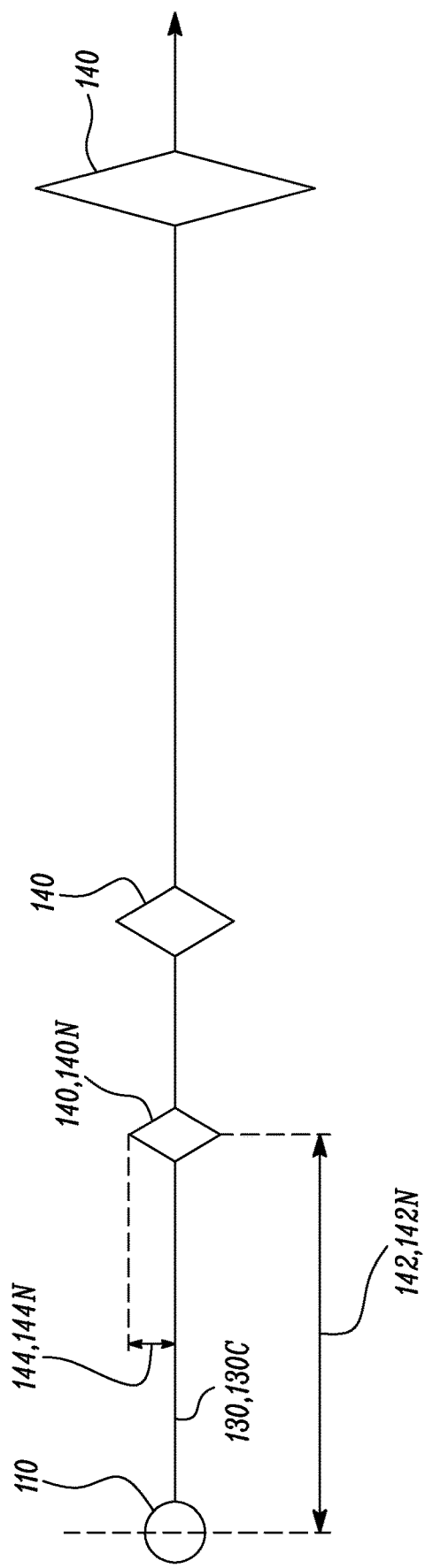
FIG. 4D illustrates a schematic representation of the corresponding ray including a new peak, according to an embodiment of the present disclosure.

FIG. 4C illustrates a schematic representation of the corresponding ray 130C of the data point 114, while the data point 114 is outside the catchment region 150 of each of the plurality of peaks 140 of the corresponding ray 130C, according to an embodiment of the present disclosure. FIG. 4D illustrates a schematic representation of the corresponding ray 130C including a new peak 140N, according to an embodiment of the present disclosure.

Referring to FIGS. 2, 4C, and 4D, for each data point 114 from the plurality of data points 114, the processor 120 is further configured to define the new peak 140N including a peak height 144N equal to the peak increment value 146 and a peak distance 142N equal to the data point distance 116 if the data point 114 is outside the catchment region 150 of each of the plurality of peaks 140 of the corresponding ray 130C.

In some embodiments, in order to define the new peak 140N, the processor 120 is further configured to remove the peak 140 from the plurality of peaks 140 including the peak height 144 less than the peak height 144 of each of the other peaks 140 from the plurality of peaks 140 of the corresponding ray 130C.

In some embodiments, the processor 120 is further configured to set the backgroundness equal to zero if the data point 114 is outside the catchment region 150 of each of the plurality of peaks 140 of the corresponding ray 130C. In other words, the processor 120 determines that the data point 114 outside the catchment region 150 of each of the plurality of peaks 140 of the corresponding ray 130C does not to belong to any static object. Therefore, the system 100 may not require high computational or memory intensive resources.

Figure 4E:
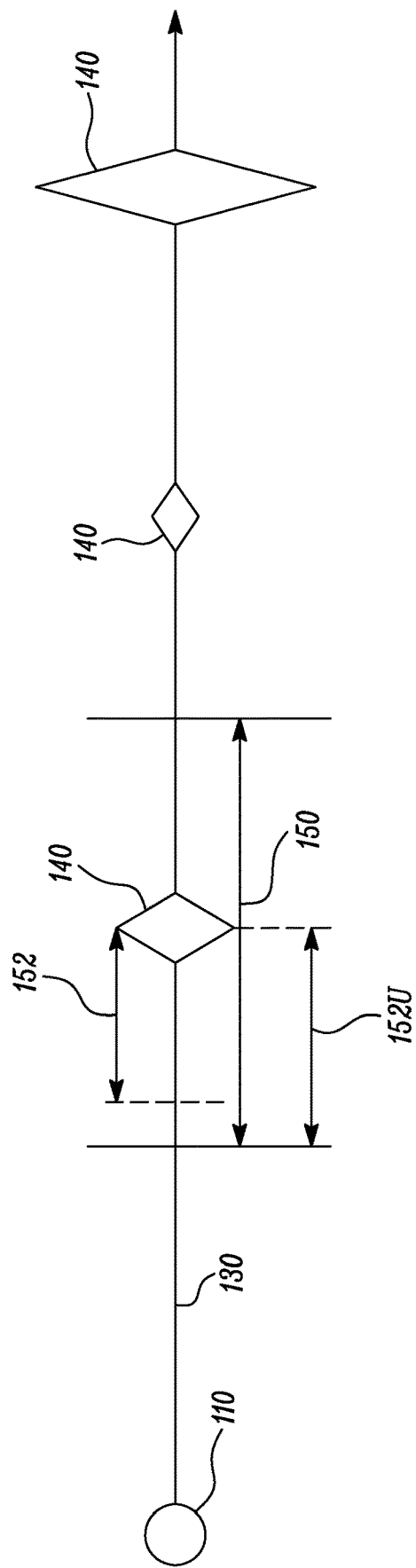
FIG. 4E illustrates a schematic representation of a ray from the plurality of rays having the catchment region including an updated catchment distance for each peak from the plurality of peaks, according to an embodiment of the present disclosure.

FIG. 4E illustrates a schematic representation of the ray 130 from the plurality of rays 130 having the catchment region 150 including an updated catchment distance 152U for each peak 140 from the plurality of peaks 140, according to an embodiment of the present disclosure. In the illustrated embodiment of FIG. 4E, the catchment region 150, the catchment distance 152, and the updated catchment distance 152U are shown for just one peak 140 for clarity purposes.

The processor 120 is further configured to update the catchment distance 152 of the catchment region 150 of each of the plurality of peaks 140 of each of the plurality of rays 130. In other words, the processor 120 is further configured to determine the updated catchment distance 152U of each of the plurality of peaks 140 of each of the plurality of rays 130. By updating the catchment distance 152, the system 100 may optimize the catchment distance 152 and may further adapt to changing environmental noise (e.g., from rain, fog, or lighting conditions), slow drifts or differences in performance of the sensor, or similar. In the illustrated embodiment of FIG. 4E, the updated catchment distance 152U is greater than the catchment distance 152. However, the updated catchment distance 152U may be smaller than the catchment distance 152.

In some embodiments, the processor 120 is configured to update the catchment distance 152 of the catchment region 150 after determining if a data point 114 from the plurality of data points 114 lies within the catchment region 150 of the containing peak 140C (as shown in FIG. 4A) or if the data point 114 is outside the catchment region 150 of each of the plurality of peaks 140 of the corresponding ray 130C (as shown in FIG. 4C) for a predetermined number of data points 114 from the plurality of data points 114. For example, the processor 120 may be configured to update the catchment distance 152 of the catchment region 150 after processing one, fifty, hundred, or thousand data points 114, as per desired application attributes. In some cases, the processor 120 may be configured to update the catchment distance 152 of the catchment region 150 after processing each data point 114 of the one measurement or the frame of the sensor 110.

Details related to updating the catchment distance 152 of the catchment region 150 will be provided below.

Figure 5:
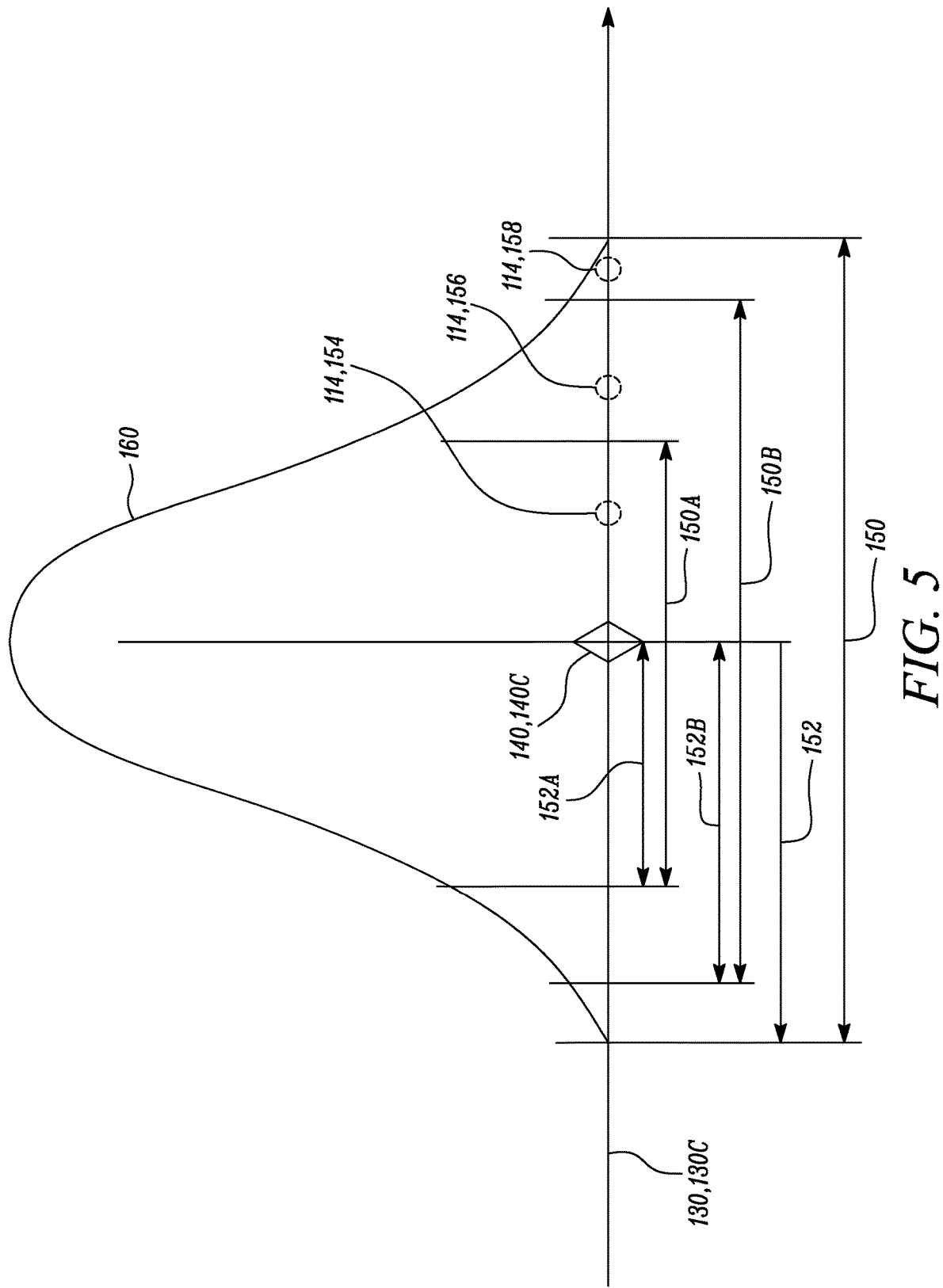
FIG. 5 illustrates an expected noise distribution around one peak from the plurality of peaks, according to an embodiment of the present disclosure.

FIG. 5 illustrates an expected noise distribution 160 around one peak 140 from the plurality of peaks 140, according to an embodiment of the present disclosure.

In some embodiments, the expected noise distribution 160 may be based on a distribution of the data points 114 around the peak 140 (i.e., the containing peak 140C). In some embodiments, the expected noise distribution 160 may be based on one or more distance noise parameters of the sensor 110. The one or more sensor parameters may be indicative of an effect of at least one of a signal to noise ratio of the sensor 110 for different distances, a reflection strength of the sensor 110 for different distances, a sensor temperature of the sensor 110 for different distances, a measurement energy of the sensor 110 for different distances, a light accumulation time of the sensor 110 of the sensor 110 for different distances, a sensor motion of the sensor 110 for different distances, a vibration level of the sensor 110 of the sensor 110 for different distances, and so forth. In some embodiments, the expected noise distribution 160 may be based on one or more environmental parameters of the 3D space 105. The one or more environmental parameters may be indicative of an effect of at least one of a lighting of the environment, a time of day, a current atmospheric condition of the environment, a current weather condition of the environment, and so forth. In some embodiments, the expected noise distribution 160 may be based on a distance noise. This is because the sensor 110 may have a distance measurement accuracy that may decrease with an increase in a distance and a noise level that grows with an increase in the distance. In the illustrated embodiment of FIG. 5, the expected noise distribution 160 is monomodal. In some embodiments, the expected noise distribution 160 is a normal distribution.

Referring to FIGS. 1 to 5, in some embodiments, the catchment region 150 for the peak 140 from the plurality of peaks 140 for each ray 130 from the plurality of rays 130 is defined based upon the expected noise distribution 160 of at least one of the one or more distance noise parameters of the sensor 110 and the one or more environmental parameters of the 3D space 105. In some embodiments, the catchment region 150 for a peak 140 from the plurality of peaks 140 for each ray 130 from the plurality of rays 130 is defined based upon the expected noise distribution 160 of the distance noise at a distance from the sensor 110.

In some embodiments, the processor 120 is configured to define a first center match region 150A for each peak 140 from the plurality of peaks 140 for each ray 130 from the plurality of rays 130. The first center match region 150A includes a first center match distance 152A from the corresponding peak 140C towards the sensor 110 and the first center match distance 152A from the corresponding peak 140C away from the sensor 110. Therefore, the first center match region 150A is twice the first center match distance 152A. The first center match distance 152A is a first fraction of the catchment distance 152. In some examples, the first fraction may be about 0.25, about 0.5, about 0.75, or about 0.9.

In some embodiments, the processor 120 is configured to define a second center match region 150B for each peak 140 from the plurality of peaks 140 for each ray 130 from the plurality of rays 130. The second center match region 150B includes a second center match distance 152B from the corresponding peak 140C towards the sensor 110 and the second center match distance 152B from the corresponding peak 140C away from the sensor 110. Therefore, the second center match region 150B is twice the second center match distance 152B. The second center match distance is a second fraction of the catchment distance 152. Further, the second fraction is greater than the first fraction. In some examples, the second fraction may be about 0.25, about 0.5, about 0.75, or about 0.99. In some cases, the second fraction may be equal to about 1. In an example, the first fraction may be 0.25 and the second fraction may be 1.

In some embodiments, for each data point 114 from the plurality of data points 114, the processor 120 is further configured to classify the data point 114 as a center match 154 if the data point 114 lies within the first center match region 150A for the containing peak 140C.

In some embodiments, for each data point 114 from the plurality of data points 114, the processor 120 is further configured to classify the data point 114 as a fringe match 156 if the data point 114 is outside the first center match region 150A for the containing peak 140C but lies within the second center match region 150B for the containing peak 140C.

In some embodiments, for each data point 114 from the plurality of data points 114, the processor 120 is further configured to classify the data point 114 as an invalid match 158 if the data point 114 is outside the second center match region 150B for the containing peak 140C but lies within the catchment region 150 of the containing peak 140C.

FIG. 6 illustrates a schematic view of the statistical data pool 165, according to an embodiment of the present disclosure.

Referring to FIGS. 1 to 6, in some embodiments, the processor 120 is configured to determine a center peak count 154A of a total number of peaks 140 having the center matches 154. In the illustrated embodiment of FIG. 6, two peaks have center matches 154. In some embodiments, the processor 120 is configured to determine a fringe peak count 156A of a total number of peaks 140 having the fringe matches 156. In the illustrated embodiment of FIG. 6, two peaks have fringe matches 156. The processor 120 may determine the center peak count 154A and the fringe peak count 156A based on the data stored in the statistical data pool 165.

In some embodiments, the processor 120 is further configured to define at least one catchment region update size β1 for the catchment region 150 of each peak 140 from the plurality of peaks 140. In some embodiments, the catchment distance 152 of the containing peak 140C is updated further based upon the at least one catchment region update size β1 of the containing peak 140C. In some embodiments, the catchment region update size β1 may be greater than or equal to 0.005, 0.01, 0.05, 0.1, 0.5. Therefore, the catchment region update size β1 may determine the magnitude of update of the catchment distance 152 for each update step. This may control how quickly the catchment distance 152 is adapted over time.

In some embodiments, the processor 120 is configured to update the catchment distance 152 of the catchment region 150 for each peak 140 from the plurality of peaks 140 for each ray 130 from the plurality of rays 130 based upon a ratio of the center peak count 154A to the fringe peak count 156A. Therefore, the processor 120 may uniformly update the catchment distance 152 of the catchment region 150 for each peak 140. Ideally, in some cases, a desired ratio X of the center peak count 154A to the fringe peak count 156A should be 1:1. However, the desired ratio X may be modified as per desired application attributes. In cases the desired ratio is set to be 1:1, the updated catchment distance 152 may be determined by the following equation:

$$c_{new} = c_{old} + \beta_1 \cdot (X - a/(a+b))$$

where,
$c_{new}$ is the updated catchment distance 152U;
$c_{old}$ is the catchment distance 152;
β1 is the catchment region update size;
X is a desired ratio of the center peak count 154A to the fringe peak count 156A;
a is the center peak count 154A; and
b is the fringe peak count 156A.

The value of X for the desired ratio 1:1 is 0.5. If the center peak count 154A is substantially greater than the fringe peak count 156A, the catchment distance 152 is decreased as the catchment distance 152 may be too large as fewer data points 114 are "near the edge" of the catchment region 150. Similarly, if the fringe peak count 156A is substantially greater than the center peak count 154A, the catchment distance 152 is increased as the catchment distance 152 may be too small as more data points 114 are "near the edge" of the catchment region 150. By updating the catchment distance 152 in such manner, the catchment distance 152 may converge to a value of the catchment distance 152 that may represent any desired coverage of the expected noise distribution 160. In the illustrated embodiment of FIG. 6, the ratio of the center peak count 154A to the fringe peak count 156A is 1:1. Therefore, the catchment distance 152 may be optimized.

As discussed above, in some embodiments, the processor 120 is configured to store the data point distance 116 of the data point 114 in the statistical data pool 165 when the data point 114 lies within the catchment region 150 of the containing peak 140C. In some embodiments, the processor 120 is further configured to store the catchment distance 152 for each peak 140 in the statistical data pool 165.

In some embodiments, for each data point 114 from the plurality of data points 114, the processor 120 is further configured to store the data point distance 116 of the data point 114 in the statistical data pool 165 if the data point 114 is classified as the center match 154 or the fringe match 156. In some embodiments, for each data point 114 from the plurality of data points 114, the processor 120 may be further configured to store the data point distance 116 of the data point 114 in the statistical data pool 165 if the data point 114 is classified as the invalid match 158.

In some embodiments, the processor 120 is further configured to update the catchment distance 152 of the catchment region 150 after a total number of the data point distances 116 stored in the statistical data pool 165 is equal to a predefined number. For example, if the processor 120 may update the catchment distance 152 of the catchment region 150 after hundred data point distances 116 are stored in the statistical data pool 165. The predefined number may be adjusted as per desired application attributes.

In some embodiments, the processor 120 is further configured to empty the statistical data pool 165 after the total number of the data point distances 116 stored in the statistical data pool 165 is equal to the predefined number. For example, the processor 120 may empty the statistical data pool 165 after hundred data point distances 116 are stored in the statistical data pool 165.

Figure 7A:
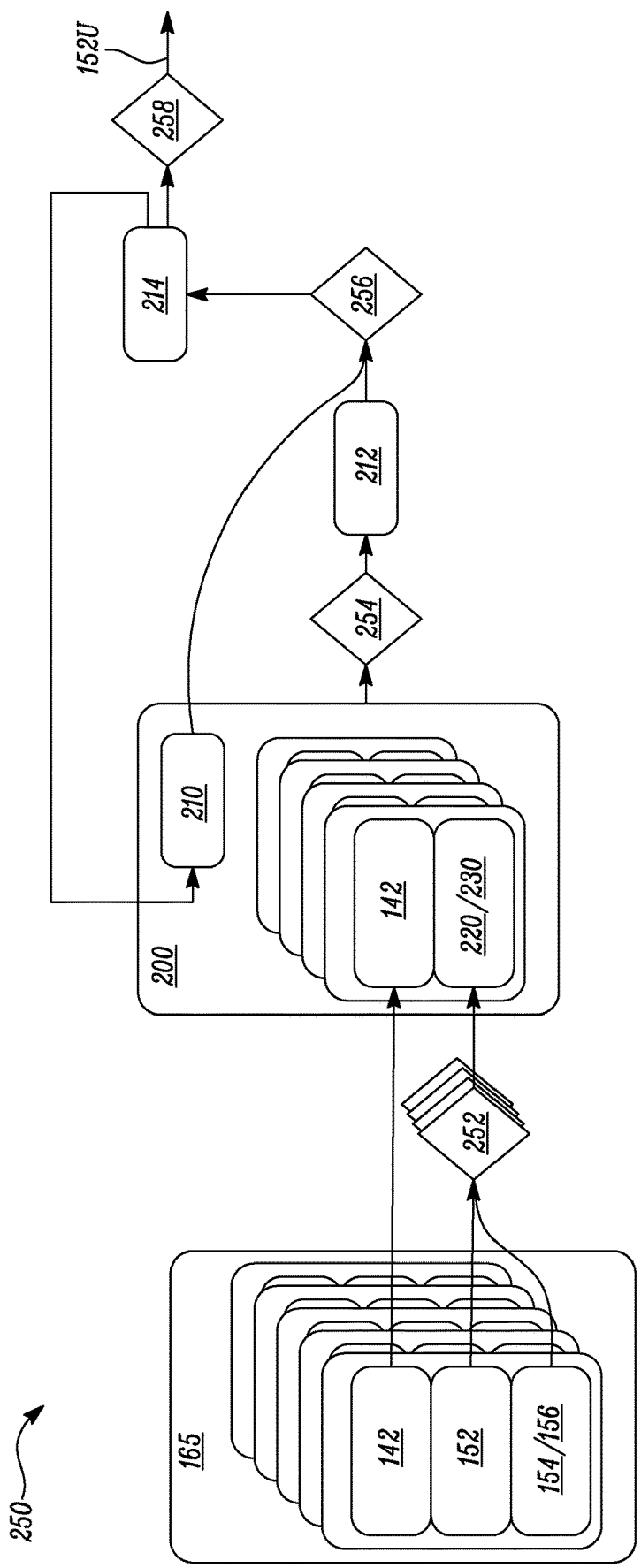
FIG. 7A illustrates a schematic flow diagram depicting various steps performed by a processor for updating a catchment distance of the catchment region, according to an embodiment of the present disclosure.

FIG. 7A illustrates a schematic flow diagram 250 depicting various steps performed by the processor 120 shown in FIG. 2 for updating the catchment distance 152 of the catchment region 150, according to an embodiment of the present disclosure.

Referring to FIGS. 1 to 7A, in some embodiments, the processor 120 is further configured to define a regression model 200 for the catchment distance 152 of the catchment region 150. In the illustrated embodiment of FIG. 7A, the regression model 200 is a function of the peak distance 142. Further, the regression model 200 includes a plurality of parameters 210. For example, the regression model 200 may be defined as:

$$\text{the catchment distance } 152 = xp^2 + yp + z,$$

where p is the peak distance 142 and x, y, and z are the plurality of parameters 210.

In some embodiments, the regression model 200 may be a simple linear regression model or any other regression model that can be adapted and sampled fast enough for real-time use on the system 100. Some examples of the regression model 200 include a polynomial regression model, a decision tree model, a support vector machine (SVM)-based regression model, a neural network model, a gaussian process model, a quantile regression model, a piecewise polynomial regression model, a spline fitting model, a ridge regression model, and so forth.

As shown in block 252, in some embodiments, for each center match 154 of the peak 140, the processor 120 is further configured to determine a difference catchment distance 220 as a difference between the catchment distance 152 and a product of the catchment distance 152 and the catchment region update size β1, i.e., $c_{new}=c_{old}-c_{old}\cdot\beta_1$.

In some embodiments, for each fringe match 156 of the peak 140, the processor 120 is further configured to determine a sum catchment distance 230 as a sum of the catchment distance 152 and a product of the catchment distance 152 and the catchment region update size β1, i.e., $c_{new}=c_{old}+c_{old}\cdot\beta1$.

As shown in block 254, in some embodiments, the processor 120 is further configured to determine a plurality of estimated parameters 212 for the regression model 200 based on the difference catchment distances 220, the sum catchment distances 230, and the peak distances 142 of the plurality of peaks 140. For example, the processor 120 may determine the plurality of estimated parameters 212 for the regression model 200 using least squares method.

As shown in block 256, in some embodiments, the processor 120 is further configured to determine a plurality of updated parameters 214 for the regression model 200 based on the plurality of parameters 210 and the plurality of estimated parameters 212 for the regression model 200. The processor 120 may determine the plurality of updated parameters 214 using a weighted average.

As shown in block 258, in some embodiments, the processor 120 is further configured to update the catchment distance 152 of the catchment region 150 based on the plurality of updated parameters 214. In other words, the processor 120 is further configured to determine the updated catchment distance 152U based on the plurality of updated parameters 214. Therefore, the processor 120 is configured to determine a variable distance-dependent catchment distance 152 that is adapted by the peak distance 142 of the peak 140 from the sensor 110. In other words, the processor 120 is configured to determine the updated catchment distance 152U individually for each peak 140 based on the peak distance 142 of the peak 140 from the sensor 110. This is because, as discussed above, the sensor 110 may have the distance measurement accuracy that may decrease with the increase in the distance and the noise level that grows with the increase in the distance. The regression model 200 may accurately capture the important relationship between the distance and the noise level.

In some embodiments, the processor 120 is further configured to provide the updated catchment distance 152U of the catchment region 150 for each peak 140 from the plurality of peaks 140 for each ray 130 from the plurality of rays 130 to a sensor monitoring system (not shown). This is because high sensor noise levels may be indicative of sensor degradation or failures.

Figure 7B:
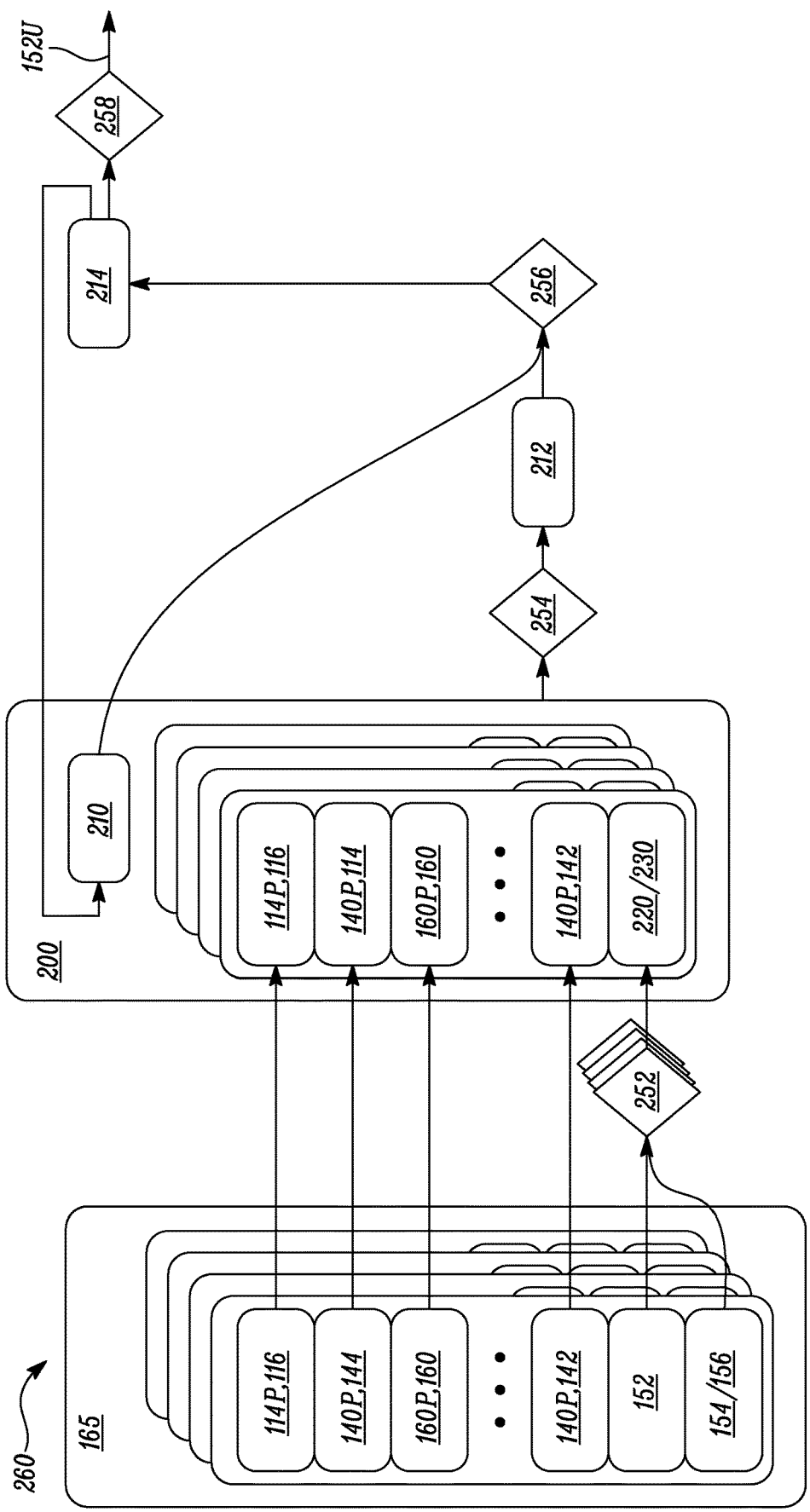
FIG. 7B illustrates a schematic flow diagram depicting various steps performed by the processor for updating the catchment distance of the catchment region, according to another embodiment of the present disclosure.

FIG. 7B illustrates a schematic flow diagram 260 depicting various steps performed by the processor 120 shown in FIG. 2 for updating the catchment distance 152 of the catchment region 150, according to another embodiment of the present disclosure.

The schematic flow diagram 260 is substantially similar to the schematic flow diagram 250 of FIG. 7A. However, according to the flow diagram 260, the regression model 200 is a function of at least one of one or more peak parameters 140P, one or more data point parameters 114P, and one or more noise parameters 160P. Therefore, the processor 120 is configured to determine the catchment distance 152 that is adapted by the one or more peak parameters 140P, the one or more data point parameters 114P, and the one or more noise parameters 160P. Thus, the regression model 200 of FIG. 7B may be a higher dimensional model and may improve a quality of detection of the background 101. However, the regression model 200 of FIG. 7B may have higher computational requirements.

In some embodiments, the one or more peak parameters 140P may include any parameter related to the peak 140, such as the peak distance 142, the peak height 144, etc. In some embodiments, the one or more data point parameters 114P may include any parameter related to the data point 114, such as the data point distance 116, a signal to noise ratio of the data points 114, and so forth. In some embodiments, the one or more noise parameters 160P may include any parameter related to a noise at the data point 114, for example, due to a noise of the sensor 110 or a noise in the environment surrounding the sensor 110. For example, the one or more noise parameters 160P may include one or more of a reflection strength, a sensor temperature, a point sensor receiver channel, a measurement energy, a light accumulation time of the sensor 110, a sensor motion (direction, speed, acceleration), a cumulative system run time, a vibration level of the sensor 110, a lighting condition of the environment, a time of day, a current atmospheric condition of the environment, and so forth.

Figure 8:
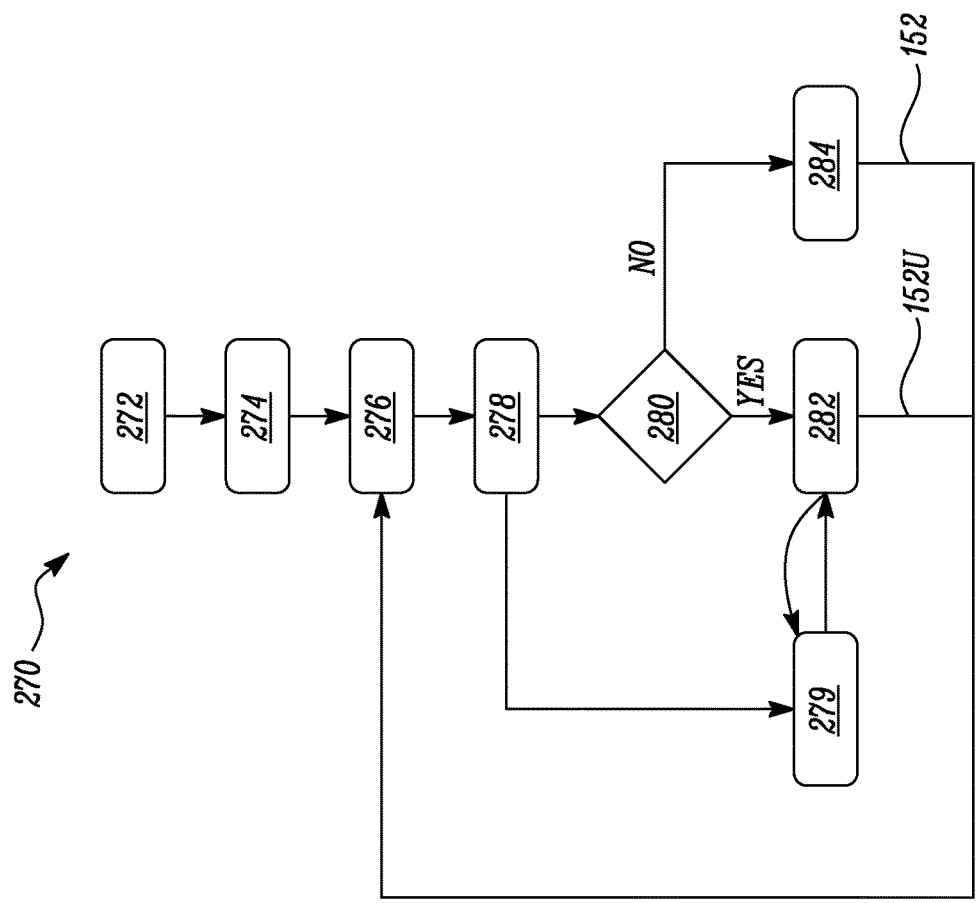
FIG. 8 illustrates a schematic flow diagram depicting various steps performed by the system for determining the background in the 3D space, according to an embodiment of the present disclosure.

FIG. 8 illustrates a schematic flow diagram 270 depicting various steps performed by the system 100 shown in FIG. 2 for determining the background 101 (shown in FIG. 1) in the 3D space 105 (shown in FIG. 1), according to an embodiment of the present disclosure.

Figure 9:
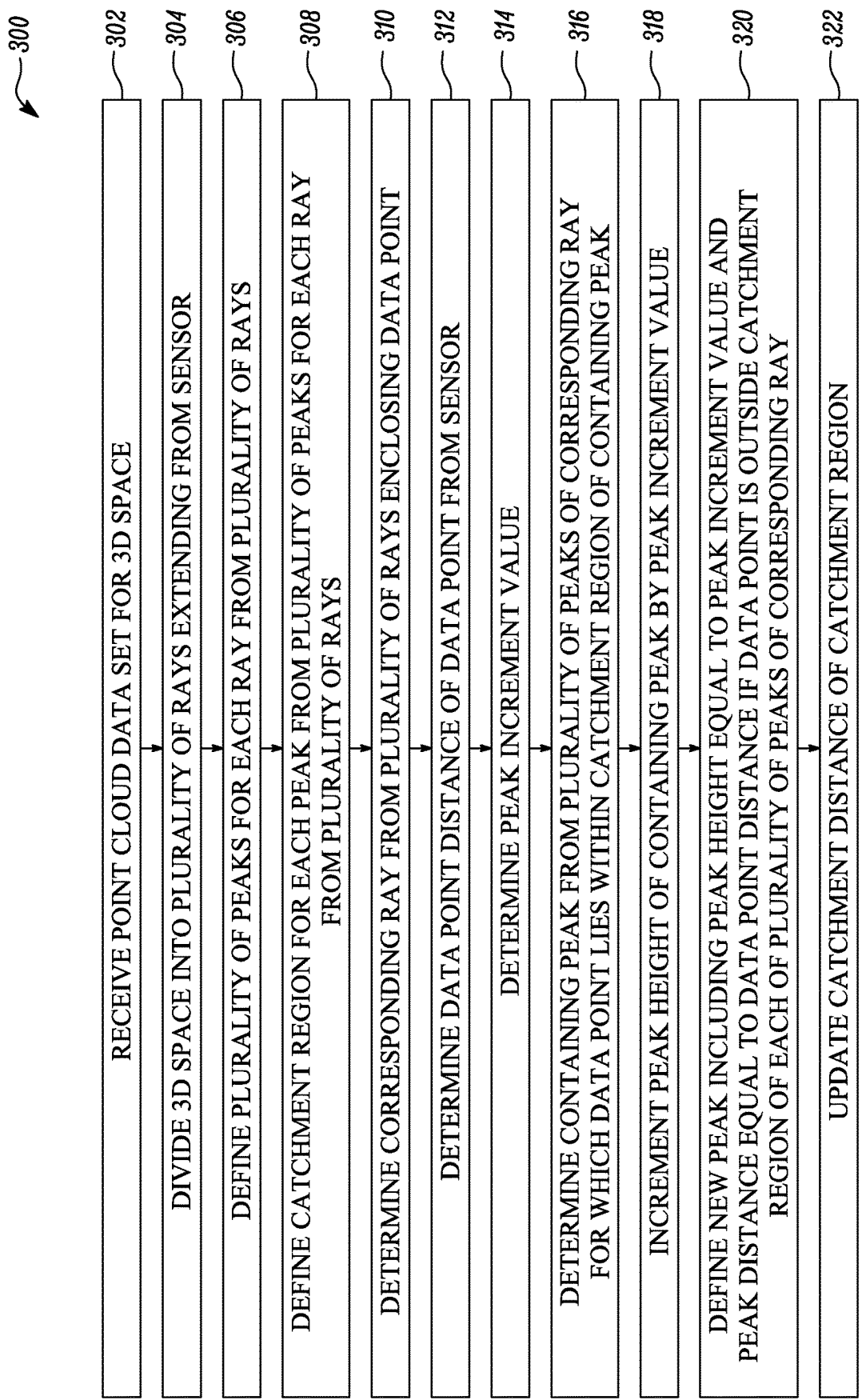
FIG. 9 illustrates a flowchart depicting a method for determining the background in the 3D space, according to an embodiment of the present disclosure.

FIG. 9 illustrates a flowchart depicting a method 300 for determining the background 101 (shown in FIG. 1) in the 3D space 105 (shown in FIG. 1), according to an embodiment of the present disclosure. The method 300 will be further described with reference to FIGS. 1 to 8.

At step 302, the method 300 includes receiving, via the sensor 110, the point cloud data set 112 for the 3D space 105. The point cloud data set 112 includes the plurality of data points 114.

At step 304, the method 300 includes dividing the 3D space 105 into the plurality of rays 130 extending from the sensor 110. Each ray 130 includes the azimuth 132 and the elevation 134 with respect to the sensor 110. Each data point 114 is enclosed by the corresponding ray 130C from the plurality of rays 130.

At block 272 of the flow diagram 270 of FIG. 8, the method 300 starts. Specifically, the step 304 of the method 300 may be followed by the block 272 of FIG. 8.

At step 306, the method 300 includes defining the plurality of peaks 140 for each ray 130 from the plurality of rays 130. Each peak 140 from the plurality of peaks 140 is located at the peak distance 142 from the sensor 110 and includes the peak height 144 equal to the predetermined initial value 145.

At step 308, the method 300 includes defining the catchment region 150 for each peak 140 from the plurality of peaks 140 for each ray 130 from the plurality of rays 130. The catchment region 150 for each peak 140 includes the catchment distance 152 from the corresponding peak 140 towards the sensor 110 and the catchment distance 152 from the corresponding peak 140 away from the sensor 110.

In some embodiments, the catchment region 150 for the peak 140 from the plurality of peaks 140 for each ray 130 from the plurality of rays 130 is defined based upon the peak distance 142 of the peak 140.

In some embodiments, the catchment region 150 for the peak 140 from the plurality of peaks 140 for each ray 130 from the plurality of rays 130 is defined based upon the expected noise distribution 160 of at least one of the one or more distance noise parameters of the sensor 110 and the one or more environmental parameters of the 3D space 105.

In some embodiments, the catchment region 150 for the peak 140 from the plurality of peaks 140 for each ray 130 from the plurality of rays 130 is defined based upon the expected noise distribution 160 of the distance noise at the distance from the sensor 110.

At block 274 of the flow diagram 270 of FIG. 8, the method 300 is initialized. Specifically, the block 274 includes the steps 306 and 308 of the method 300.

Further, at block 276 of the flow diagram 270 of FIG. 8, the method 300 receives new measurement. Specifically, the block 276 includes the step 302 of the method 300.

At step 310, the method 300 includes, for each data point 114 from the plurality of data points 114, determining the corresponding ray 130C from the plurality of rays 130 enclosing the data point 114.

At step 312, the method 300 includes, for each data point 114 from the plurality of data points 114, determining the data point distance 116 of the data point 114 from the sensor 110. In some embodiments, the corresponding ray 130C from the plurality of rays 130 enclosing the data point 114 from the plurality of rays 130 may be determined based on the data point distance 116 of the data point 114, the azimuth 132, and the elevation 134.

At step 314, the method 300 includes, for each data point 114 from the plurality of data points 114, determining the peak increment value 146.

At step 316, the method 300 includes, for each data point 114 from the plurality of data points 114, determining the containing peak 140C from the plurality of peaks 140 of the corresponding ray 130C for which the data point 114 lies within the catchment region 150 of the containing peak 140C. In some embodiments, in case the data point 114 lies within the catchment region 150 of the multiple peaks 140 from the plurality of peaks 140 of the corresponding ray 130C, the containing peak 140C is determined based on at least one of the peak heights 144 of the multiple peaks 140, the peak distances 142 of the multiple peaks 140, and the distance of the data point 114 from each of the multiple peaks 140.

At step 318, the method 300 includes, for each data point 114 from the plurality of data points 114, incrementing the peak height 144 of the containing peak 140C by the peak increment value 146.

At step 320, the method 300 includes, for each data point 114 from the plurality of data points 114, defining the new peak 140N including the peak height 144N equal to the peak increment value 146 and the peak distance 142N equal to the data point distance 116 if the data point 114 is outside the catchment region 150 of each of the plurality of peaks 140 of the corresponding ray 130C. In some embodiments, defining the new peak 140N further includes removing the peak 140 from the plurality of peaks 140 including the peak height 144 less than the peak height 144 of each of the other peaks 140 from the plurality of peaks 140 of the corresponding ray 130C. In some embodiments, the method 300 further includes updating the peak distance 142 of the containing peak 140C based at least on the data point distance 116 of the data point 114 lying within the catchment region 150 of the containing peak 140C.

At block 278 of the flow diagram 270 of FIG. 8, the method 300 collects data. Specifically, the block 264 includes the steps 310, 312, 314, 316, 318, and 320 of the method 300.

In some embodiments, the method 300 further includes storing the data point distance 116 of the data point 114 in the statistical data pool 165 when the data point 114 lies within the catchment region 150 of the containing peak 140C (as shown in block 279 of FIG. 8). Specifically, the line connecting the blocks 278 and 279 schematically illustrates flow of the data from the block 278 to the block 279.

In some embodiments, the method 300 further includes defining the first center match region 150A for each peak 140 from the plurality of peaks 140 for each ray 130 from the plurality of rays 130. The first center match region 150A includes the first center match distance 152A from the corresponding peak 140C towards the sensor 110 and the first center match distance 152A from the corresponding peak 140C away from the sensor 110. Further, as discussed above, the first center match distance 152A is the first fraction of the catchment distance 152.

In some embodiments, the method 300 further includes defining the second center match region 150B for each peak 140 from the plurality of peaks 140 for each ray 130 from the plurality of rays 130. The second center match region 150B includes the second center match distance 152B from the corresponding peak 140C towards the sensor 110 and the second center match distance 152B from the corresponding peak 140C away from the sensor 110. The second center match distance 152B is the second fraction of the catchment distance 152. Further, the second fraction is greater than the first fraction.

In some embodiments, for each data point 114 from the plurality of data points 114, the method 300 further includes classifying the data point 114 as the center match 154 if the data point 114 lies within the first center match region 150A for the containing peak 140C.

In some embodiments, for each data point 114 from the plurality of data points 114, the method 300 further includes classifying the data point 114 as the fringe match 156 if the data point 114 is outside the first center match region 150A for the containing peak 140C but lies within the second center match region 150B for the containing peak 140C.

In some embodiments, for each data point 114 from the plurality of data points 114, the method 300 further includes classifying the data point 114 as the invalid match 158 if the data point 114 is outside the second center match region 150B for the containing peak 140C but lies within the catchment region 150 of the containing peak 140C.

In some embodiments, for each data point 114 from the plurality of data points 114, the method 300 further includes storing the data point distance 116 of the data point 114 in the statistical data pool 165 if the data point 114 is classified as the center match 154 or the fringe match 156.

In some embodiments, at the block 278, the method 300 may further include determining the backgroundness for each data point 114 from the plurality of data points 114. In some embodiments, determining the backgroundness of the data point 114 further includes setting the backgroundness equal to zero if the data point 114 is outside the catchment region 150 of each of the plurality of peaks 140 of the corresponding ray 130C.

In some embodiments, determining the backgroundness of the data point 114 further includes determining the backgroundness of the data point 114 based at least on the peak height 144, the peak distance 142, and the catchment distance 152 of the catchment region 150 for the containing peak 140C if the data point 114 lies within the catchment region 150 of the containing peak 140C. In some embodiments, the backgroundness is determined further based on the magnitude of the difference between the data point distance 116 and the peak distance 142 of the containing peak 140C.

At block 280 of the flow diagram 270 of FIG. 8, the method 300 determines if the total number of the data point distances 116 stored in the statistical data pool 165 is equal to the predefined number.

The flow diagram 270 of FIG. 8 further illustrates two different paths in which the method 300 may proceed if the total number of the data point distances 116 stored in the statistical data pool 165 is equal to the predefined number and if the total number of the data point distances 116 stored in the statistical data pool 165 is not equal to the predefined number. Specifically, "YES" refers to a case in which the total number of the data point distances 116 stored in the statistical data pool 165 is equal to the predefined number and "NO" refers to a case in which the total number of the data point distances 116 stored in the statistical data pool 165 is not equal to the predefined number. More specifically, the method 300 proceeds to block 282 if the total number of the data point distances 116 stored in the statistical data pool 165 is equal to the predefined number and the method 300 proceeds to block 284 if the total number of the data point distances 116 stored in the statistical data pool 165 is not equal to the predefined number.

At step 322, the method 300 includes, updating the catchment distance 152 of the catchment region 150 of each of the plurality of peaks 140 of each of the plurality of rays 130 (shown in block 282 of FIG. 8). In other words, the method 300 includes determining the updated catchment distance 152U of the catchment region 150. Specifically, in some embodiments, the catchment distance 152 of the catchment region 150 is updated after the total number of the data point distances 116 stored in the statistical data pool 165 is equal to the predefined number. In some embodiments, the method 300 further includes providing the updated the catchment distance 152U of the catchment region 150 for each peak 140 from the plurality of peaks 140 for each ray 130 from the plurality of rays 130 to the sensor monitoring system (not shown).

There is a bidirectional flow of the data between the blocks 279 and 282. This is because, the data from the statistical data pool 165 may be required to update the catchment distance 152 of the catchment region 150 and the updated catchment distance 152U may be further stored in the statistical data pool 165 for the next update.

In some embodiments, the catchment distance 152 of the catchment region 150 is updated after determining if the data point 114 from the plurality of data points 114 lies within the catchment region 150 of the containing peak 140C or if the data point 114 is outside the catchment region 150 of each of the plurality of peaks 140 of the corresponding ray 130C for the predetermined number of data points from the plurality of data points 114.

In some embodiments, the method 300 further includes emptying the statistical data pool 165 after the total number of the data point distances 116 stored in the statistical data pool 165 is equal to the predefined number.

In some embodiments, the method 300 further includes determining the center peak count 154A of the total number of peaks 140 having the center matches 154. In some embodiments, the method 300 further includes determining the fringe peak count 156A of the total number of peaks 140 having the fringe matches 156. In some embodiments, the method 300 further includes updating the catchment distance 152 of the catchment region 150 for each peak 140 from the plurality of peaks 140 for each ray 130 from the plurality of rays 130 based upon the ratio of the center peak count 154A to the fringe peak count 156A.

In some embodiments, the method 300 further includes defining the regression model 200 for the catchment distance 152 of the catchment region 150. In some embodiments, the regression model 200 is the function of the peak distance 142. In some embodiments, the regression model 200 is a function of at least one of the one or more peak parameters 140P, the one or more data point parameters 114P, and the one or more noise parameters 160P. The regression model 200 includes the plurality of parameters 210.

In some embodiments, the method 300 further includes defining the at least one catchment region update size $\beta 1$ for the catchment region 150 of each peak 140 from the plurality of peaks 140. The catchment distance 152 of the containing peak 140C is updated further based upon the at least one catchment region update size $\beta 1$ of the containing peak 140C.

In some embodiments, the method 300 further includes, for each center match 154 of the peak 140, determining the difference catchment distance 220 as the difference between the catchment distance 152 and the product of the catchment distance 152 and the catchment region update size $\beta 1$. In some embodiments, the method 300 further includes, for each fringe match 156 of the peak 140, determining the sum catchment distance 230 as the sum of the catchment distance 152 and the product of the catchment distance 152 and the catchment region update size $\beta 1$.

In some embodiments, the method 300 further includes determining the plurality of estimated parameters 212 for the regression model 200 based on the difference catchment distances 220 and the sum catchment distances 230 and the peak distances 142 of the plurality of peaks 140. In some embodiments, the method 300 further includes determining the plurality of updated parameters 214 for the regression model 200 based on the plurality of parameters 210 and the plurality of estimated parameters 212 for the regression model 200. In some embodiments, the method 300 further includes updating the catchment distance 152 of the catchment region 150 based on the plurality of updated parameters 214.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), tensor processing units (TPUs), neuromorphic chips, vector accelerators, or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

LIST OF ELEMENTS

A Computing Device
B Computing Device
100 System
101 Background
105 Three-Dimensional (3D) Space
110 Sensor
111 Field of View (FOV)
112 Point Cloud Data Set
114 Data Point
114P Data Point Parameters
116 Data Point Distance
120 Processor
125 Output
130 Rays
130C Corresponding Ray
132 Azimuth
134 Elevation
140 Peak
140C Containing Peak
140N New Peak
140P Peak Parameters
142 Peak Distance
142R Peak Distance
142N Peak Distance
143A Initial Peak Distance
143B Updated Peak Distance
144 Peak Height
144N Peak Height
145 Predetermined Initial Value
146 Peak Increment Value
150 Catchment Region
150A First Center Match Region
150B Second Center Match Region
152 Catchment Distance
152A First Center Match Distance
152B Second Center Match Distance
152U Updated Catchment Distance
154 Center Match
154A Center Peak Count
156 Fringe Match
156A Fringe Peak Count
158 Invalid Match
160 Expected Noise Distribution
160P Noise Parameters
165 Expected Noise Distribution
180 Point Cloud Fusion Module
185 Fused Cloud Data Set
190 Object Detection Module
195 Perception Output
200 Regression Model
210 Parameters
212 Estimated Parameters
214 Updated Parameters
220 Difference Catchment Distance
230 Sum Catchment Distance
250 Flow Diagram
252 Block
254 Block
256 Block
258 Block
260 Flow Diagram
270 Flow Diagram
272 Block
274 Block
276 Block
278 Block
279 Block
280 Block
282 Block
284 Block
300 Method
302 Step
304 Step
304 Step
306 Step
308 Step
310 Step
312 Step
314 Step
316 Step
314 Step
318 Step
320 Step
322 Step

The invention claimed is:

1. A method for determining a background in a three-dimensional (3D) space, the method comprising:
receiving, via a sensor, a point cloud data set for the 3D space, wherein the point cloud data set comprises a plurality of data points;
dividing the 3D space into a plurality of rays extending from the sensor, wherein each ray comprises an azimuth and an elevation with respect to the sensor, and wherein each data point is enclosed by a corresponding ray from the plurality of rays;
defining a plurality of peaks for each ray from the plurality of rays, wherein each peak from the plurality of peaks is located at a peak distance from the sensor and comprises a peak height equal to a predetermined initial value;
defining a catchment region for each peak from the plurality of peaks for each ray from the plurality of rays, wherein the catchment region for each peak comprises a catchment distance from the corresponding peak towards the sensor and the catchment distance from the corresponding peak away from the sensor;
wherein, for each data point from the plurality of data points, the method further comprises:

determining the corresponding ray from the plurality of rays enclosing the data point;

determining a data point distance of the data point from the sensor;

determining a peak increment value;

determining a containing peak from the plurality of peaks of the corresponding ray for which the data point lies within the catchment region of the containing peak;

incrementing the peak height of the containing peak by the peak increment value; and defining a new peak comprising a peak height equal to the peak increment value and a peak distance equal to the data point distance if the data point is outside the catchment region of each of the plurality of peaks of the corresponding ray; and updating the catchment distance of the catchment region of each of the plurality of peaks of each of the plurality of rays.

2. The method of claim 1, wherein the catchment region for a peak from the plurality of peaks for each ray from the plurality of rays is defined based upon the peak distance of the peak.

3. The method of claim 1, wherein the catchment region for a peak from the plurality of peaks for each ray from the plurality of rays is defined based upon an expected noise distribution of at least one of one or more distance noise parameters of the sensor and one or more environmental parameters of the 3D space.

4. The method of claim 1, wherein the catchment region for a peak from the plurality of peaks for each ray from the plurality of rays is defined based upon an expected noise distribution of a distance noise at a distance from the sensor.

5. The method of claim 1, wherein the catchment distance of the catchment region is updated after determining if a data point from the plurality of data points lies within the catchment region of the containing peak or if the data point is outside the catchment region of each of the plurality of peaks of the corresponding ray for a predetermined number of data points from the plurality of data points.

6. The method of claim 1, further comprising storing the data point distance of the data point in a statistical data pool when the data point lies within the catchment region of the containing peak.

7. The method of claim 6, wherein the catchment distance of the catchment region is updated after a total number of the data point distances stored in the statistical data pool is equal to a predefined number.

8. The method of claim 7, further comprising emptying the statistical data pool after the total number of the data point distances stored in the statistical data pool is equal to the predefined number.

9. The method of claim 1, the method further comprising:

defining a first center match region for each peak from the plurality of peaks for each ray from the plurality of rays, wherein the first center match region comprises a first center match distance from the corresponding peak towards the sensor and the first center match distance from the corresponding peak away from the sensor, and wherein the first center match distance is a first fraction of the catchment distance; and defining a second center match region for each peak from the plurality of peaks for each ray from the plurality of rays, wherein the second center match region comprises a second center match distance from the corresponding peak towards the sensor and the second center match distance from the corresponding peak away from the sensor, wherein the second center match distance is a second fraction of the catchment distance, and wherein the second fraction is greater than the first fraction.

10. The method of claim 9, wherein, for each data point from the plurality of data points, the method further comprises:

classifying the data point as a center match if the data point lies within the first center match region for the containing peak;

classifying the data point as a fringe match if the data point is outside the first center match region for the containing peak but lies within the second center match region for the containing peak;

classifying the data point as an invalid match if the data point is outside the second center match region for the containing peak but lies within the catchment region of the containing peak; and storing the data point distance of the data point in a statistical data pool if the data point is classified as the center match or the fringe match.

11. The method of claim 10, further comprising:

determining a center peak count of a total number of peaks having the center matches;

determining a fringe peak count of a total number of peaks having the fringe matches; and updating the catchment distance of the catchment region for each peak from the plurality of peaks for each ray from the plurality of rays based upon a ratio of the center peak count to the fringe peak count.

12. The method of claim 1 further comprising:

defining a regression model for the catchment distance of the catchment region, wherein the regression model is a function of the peak distance, and wherein the regression model comprises a plurality of parameters;

for each center match of the peak, determining a difference catchment distance as a difference between the catchment distance and a product of the catchment distance and a catchment region update size;

for each fringe match of the peak, determining a sum catchment distance as a sum of the catchment distance and a product of the catchment distance and the catchment region update size;

determining a plurality of estimated parameters for the regression model based on the difference catchment distances and the sum catchment distances and the peak distances of the plurality of peaks;

determining a plurality of updated parameters for the regression model based on the plurality of parameters and the plurality of estimated parameters for the regression model; and updating the catchment distance of the catchment region based on the plurality of updated parameters.

13. The method of claim 1, further comprising defining at least one catchment region update size for the catchment region of each peak from the plurality of peaks, and wherein the catchment distance of the containing peak is updated further based upon the at least one catchment region update size of the containing peak.

14. The method of claim 1 further comprising defining a regression model for the catchment distance of the catchment region, wherein the regression model is a function of at least one of one or more peak parameters, one or more data point parameters, and one or more noise parameters.

15. The method of claim 1, further comprising providing the updated the catchment distance of the catchment region for each peak from the plurality of peaks for each ray from the plurality of rays to a sensor monitoring system.

16. A system for determining a background in a three-dimensional (3D) space, the system comprising:
- a sensor configured to generate a point cloud data set for the 3D space, wherein the point cloud data set comprises a plurality of data points; and
- a processor communicably coupled to the sensor, the processor configured to:
  - receive the point cloud data set from the sensor;
  - divide the 3D space into a plurality of rays extending from the sensor, wherein each ray comprises an azimuth and an elevation with respect to the sensor, and wherein each data point is enclosed by a corresponding ray from the plurality of rays;
  - define a plurality of peaks for each ray from the plurality of rays, wherein each peak from the plurality of peaks is located at a peak distance from the sensor and comprises a peak height equal to a predetermined initial value; and
  - define a catchment region for each peak from the plurality of peaks for each ray from the plurality of rays, wherein the catchment region for each peak comprises a catchment distance from the corresponding peak towards the sensor and the catchment distance from the corresponding peak away from the sensor;
- wherein, for each data point from the plurality of data points, the processor is further configured to:
  - determine the corresponding ray from the plurality of rays enclosing the data point;
  - determine a data point distance of the data point from the sensor;
  - determine a peak increment value;
  - determine a containing peak from the plurality of peaks of the corresponding ray for which the data point lies within the catchment region of the containing peak;
  - increment the peak height of the containing peak by the peak increment value; and
  - define a new peak comprising a peak height equal to the peak increment value and a peak distance equal to the data point distance if the data point is outside the catchment region of each of the plurality of peaks of the corresponding ray; and
- wherein the processor is further configured to update the catchment distance of the catchment region of each of the plurality of peaks of each of the plurality of rays.

17. The system of claim 16, wherein the catchment region for a peak from the plurality of peaks for each ray from the plurality of rays is defined based upon the peak distance of the peak.

18. The system of claim 16, wherein the catchment region for a peak from the plurality of peaks for each ray from the plurality of rays is defined based upon an expected noise distribution of at least one of one or more distance noise parameters of the sensor and one or more environmental parameters of the 3D space.

19. The system of claim 16, wherein the processor is configured to update the catchment distance of the catchment region after determining if a data point from the plurality of data points lies within the catchment region of the containing peak or if the data point is outside the catchment region of each of the plurality of peaks of the corresponding ray for a predetermined number of data points from the plurality of data points.

20. The system of claim 16, wherein the processor is further configured to:
- store the data point distance of the data point in a statistical data pool when the data point lies within the catchment region of the containing peak;
- update the catchment distance of the catchment region after a total number of the data point distances stored in the statistical data pool is equal to a predefined number; and
- empty the statistical data pool after the total number of the data point distances stored in the statistical data pool is equal to the predefined number.

* * * * *